Figure 1:
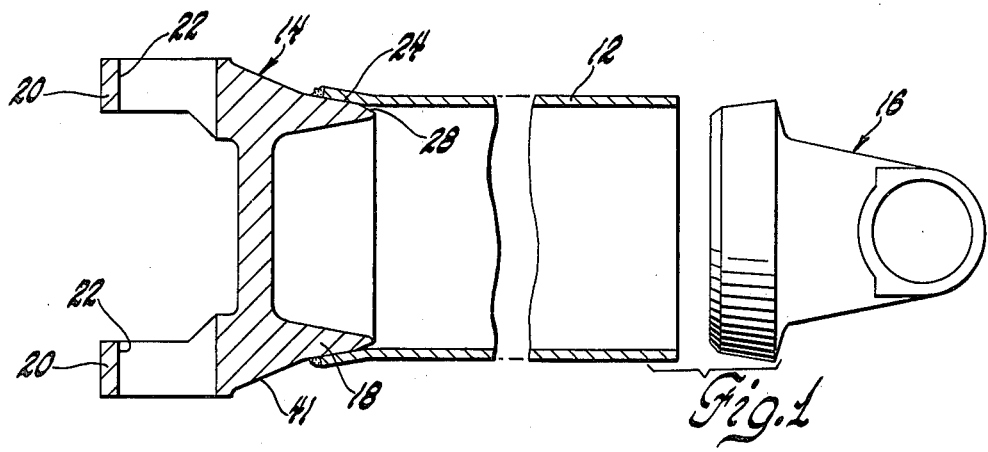

United States Patent [19]

Barnard

[11] 4,307,833
[45] Dec. 29, 1981

[54] METHOD OF MANUFACTURING A YOKE AND TUBE ARRANGEMENT

[75] Inventor: George O. Barnard, Chagrin Falls, Ohio

[73] Assignee: General Motors Corporation, Detroit, Mich.

[21] Appl. No.: 866,524

[22] Filed: Jan. 3, 1978

[51] Int. Cl.³ .............................................. B23K 31/02
[52] U.S. Cl. .................................. 228/136; 228/154; 228/173 F; 29/525
[58] Field of Search ........... 228/135, 136, 154, 173 A, 228/173 F; 285/332.1, 334.5, 382.4, 286; 29/525; 403/282

[56] References Cited

U.S. PATENT DOCUMENTS

| | | | |
|---|---|---|---|
| 1,488,128 | 3/1924 | MacDonald | 285/382.4 |
| 1,762,407 | 6/1930 | Mogford et al. | 228/135 |
| 2,005,267 | 6/1935 | Rehder | 285/334.5 |
| 2,291,420 | 7/1942 | Swenson | 228/165 |
| 3,466,738 | 9/1969 | Mount | 285/382.4 |

*Primary Examiner*—Gil Weidenfeld
*Assistant Examiner*—K. J. Ramsey
*Attorney, Agent, or Firm*—F. J. Fodale

[57] ABSTRACT

A method of manufacturing a yoke and tube arrangement utilizes a forged yoke having an attaching collar with an unmachined outer conical surface. A tube is pressed on the conical surface wedging the tube end radially outward inducing residual compressive stresses and forming a natural fillet. The tube and yoke are then fillet welded together.

1 Claim, 3 Drawing Figures

METHOD OF MANUFACTURING A YOKE AND TUBE ARRANGEMENT

This invention relates generally to yoke and tube arrangements used in propeller shaft assemblies and the like and more particularly to a method of manufacturing such an arrangement.

Heretofore, yoke and tube arrangements have been manufactured utilizing two basic components—a forged yoke member and a length of tube. The yoke member was generally forged to a shape having an attaching collar and a pair of longitudinal lugs at the opposite end. Several operations were performed on the lug end of the forged yoke to provide a pair of longitudinal ears having cross holes used to combine the yoke and tube arrangement with other components of the propeller shaft assembly. Typically, the cross holes received bearings and the arm ends of a spider carried by another yoke to provide a Cardan type universal joint.

The attaching collar of the forged yoke was turned to provide an accurately dimensioned, slightly part-spherical press surface and a ring groove was machined in at the end of the press surface to provide a stop shoulder.

The end of the tube to be joined to the yoke was faced and chamfered and then the tube was pressed onto the press surface of the yoke and butted against the stop shoulder. The yoke and tube were then welded together at the butt joint between the tube end and the stop shoulder of the yoke.

The object of this invention is to provide an improved method for manufacturing a yoke and tube arrangement which also results in an improved arrangement. More specifically, machining operations on the attaching collar of the forged yoke are eliminated thereby reducing costs and the tube is attached to the collar in a manner which results in an arrangement having an improved fatigue strength and a stronger weld. The improved method further makes it possible to use a yoke of common design with tubes of different wall thickness and inner diameter.

Other objects and features of the invention will become apparent to those skilled in the art as the disclosure is made in the following detailed description of a preferred embodiment of the invention as illustrated in the accompanying sheet of drawing in which:

FIG. 1 is a longitudinal section of a yoke and tube arrangement manufactured in accordance with this invention. A second yoke of common design is shown aligned with the opposite end of the tube.

Figure 2:
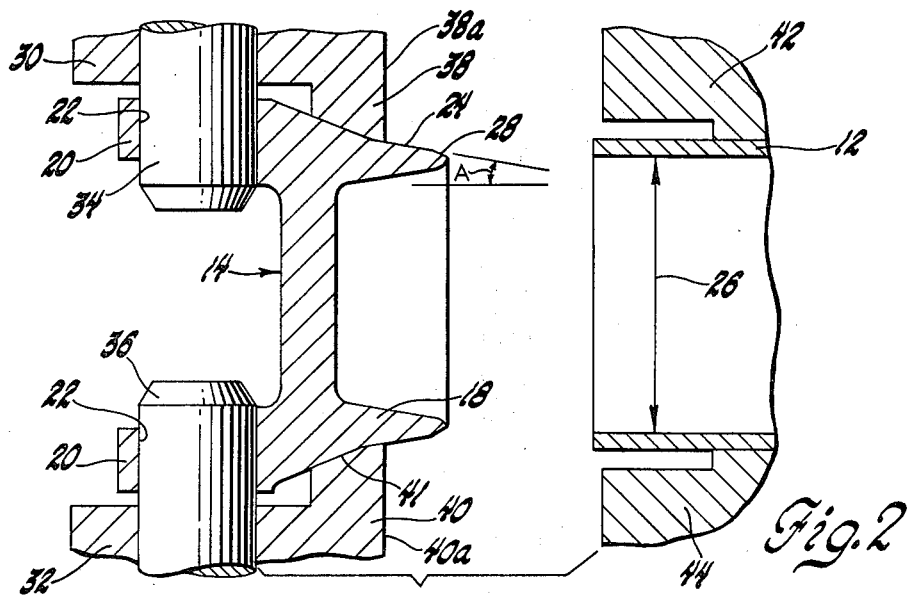

FIG. 2 schematically illustrates the yoke and tube of FIG. 1 as separate components clamped in machine fixtures prior to assembly to each other.

Figure 3:
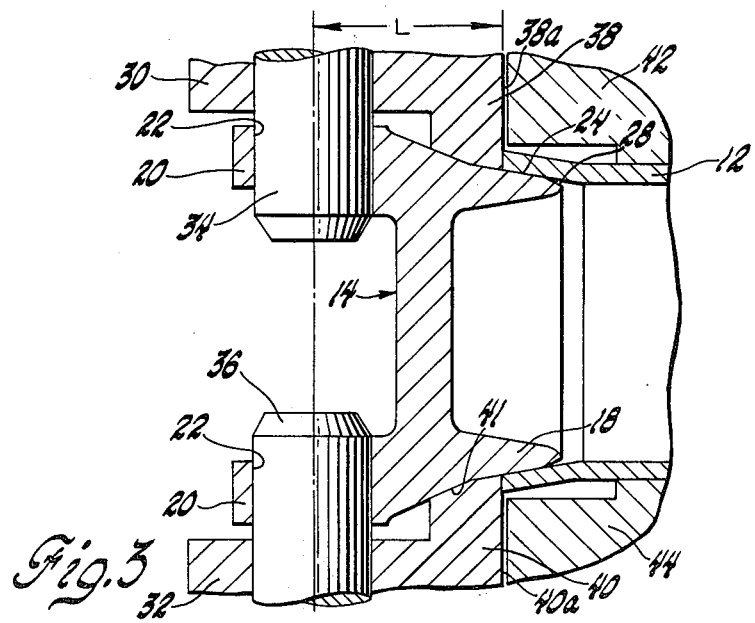

FIG. 3 schematically illustrates the yoke and tube of FIG. 2 clamped in the machine fixtures and assembled to each other.

Referring now to FIG. 1, there is shown disclosed an arrangement comprising a tube 12 and a yoke 14 which arrangement is manufactured by the method of this invention. A second yoke 16 of common design is shown juxtaposed the opposite end of the tube 12. The yoke 16 is rotated 90° on the longitudinal axis of the tube 12 from the position of the yoke 14 to better illustrate the features of the common yoke design.

The yoke 14 is made from a forging (not shown) having an attaching collar 18 at one end of the shape down in FIG. 1. The forging comprises two longitudinal lugs at the opposite end (not shown). Several typical operations such as broaching, drilling and reaming are performed on the lugs to shape two ears 20 having cross holes 22. The attaching collar 18 remains "as forged" and thus has an unmachined outer conical surface 24.

Initially the tube 12 is cylindrical and of uniform diameter as shown in FIG. 2. The tube 12 has an internal diameter 26 sized to have an interference fit with the conical surface 24 of the attaching collar 18 and does not require special preparation such as end facing and chamfering as in the previously known manufacturing method discussed above. It is to be noted, however, that the conical surface 24 of the "as forged" attaching collar 18 preferably merges into an unmachined end chamfer 28.

FIG. 2 illustrates the tube 12 and yoke 14 placed in schematically represented clamping fixtures of a machine for pressing the tube 12 onto the yoke 14. The clamping fixture for the yoke 14 comprises laterally movable jaws 30 and 32 which respectively include pins 34 and 36 and clamp plates 38 and 40. In the closed position, the pins 34 and 36 pilot in the cross holes 22 and the clamp plates 38 and 40 clampingly engage the outer surface of the yoke 14. The faces 38a and 40a of the clamp plates 38 and 40 function as tube stops and thus the clamp plates 38 and 40 are shaped to engage the yoke surface 41 and a small portion of the conical surface 24.

The clamping fixture for the tube 12 comprises a lower semicircular cradle (not shown) and a pair of pivotal jaws 42 and 44 which when closed engage the upper half of the tube 12 and clamp it against the lower cradle.

The two clamping fixtures are part of a machine which moves the clamping fixtures toward each other to press the end of the tube 12 at its internal diameter onto the unmachined conical surface 24 of the attaching collar 18. As the tube 12 is pressed on the conical surface 24, the end of the tube is wedged radially outward and residual compressive stresses are induced in the outer fibers at the end of the tube.

FIG. 3 shows the tube 12 pressed onto the unmachined conical surface 24 of the attaching collar 18 to a predetermined position where the end face of the tube end abuts the faces 38a and 40a of the clamp plates 38 and 40. This controls the dimension L between the end of the tube 12 and the axis of the cross holes which is important in establishing the proper length for the arrangement.

After assembly the end face of the tube 12 and the conical outer surface 24 of the attaching collar 18 of the yoke 14 provide a natural fillet which is advantageously utilized in a subsequent operation wherein yoke 14 is welded to the tube 12 around the deformed end at the fillet as shown in FIG. 1. This fillet welding distributes the heat more uniformly between the yoke 14 and the tube 12 reducing the adverse heat effect on the tube end and thus providing a stronger weld joint in comparison to the arrangements made by the prior method noted above which used a butt weld. Further the induced compressive stresses produced during the pressing operation at least partially counteract the torsional stresses encountered by the arrangement during normal operation as part of a propeller shaft assembly. This in turn improves the fatigue strength of the arrangement.

Also I have found that when the draft angle A is about 8°, yokes of common design can be used with 0.095 inch thick wall tubes as well as 0.065 inch thick wall tubes, of the same outer diameter. Thus the method of this invention also has the advantage of utilizing a yoke of common design in different arrangements.

I wish it to be understood that I do not desire to be limited to the exact details of the method and constructions shown and described, for obvious modifications will occur to a person skilled in the art.

I claim:

1. A method of manufacturing a yoke and tube arrangement comprising the steps of (1) forming a yoke having ears with cross holes at one end and an attaching collar at an opposite end having an unmachined outer conical surface; (2) forming a tube of uniform diameter and wall thickness having an internal diameter sized to have interference fit with the unmachined conical surface of the yoke; (3) pressing one end of the tube at its internal diameter onto the unmachined conical surface of the yoke to a predetermined distance to control the length between the end face of the tube and the axis of the cross holes and so that the tube is wedged radially outward and residual compressive stresses are induced in the outer fibers of the tube to oppose torsional stresses encountered during latter operation thereof; and (4) welding the yoke to the tube around the deformed end of the tube at a fillet formed by the end face of the tube and the unmachined conical surface of the yoke.

* * * * *

UNITED STATES PATENT AND TRADEMARK OFFICE
CERTIFICATE OF CORRECTION

PATENT NO. : 4,307,833

DATED : December 29, 1981

INVENTOR(S) : George A. Barnard

It is certified that error appears in the above—identified patent and that said Letters Patent is hereby corrected as shown below:

Title page, Item [75] "Inventor: George O. Barnard, Chagrin Falls, Ohio" should read -- Inventor: George A. Barnard, Chagrin Falls, Ohio --.

Column 1, line 68, "down" should read -- shown --.

Signed and Sealed this

Twenty-third Day of March 1982

[SEAL]

Attest:

Attesting Officer

GERALD J. MOSSINGHOFF

Commissioner of Patents and Trademarks